United States Patent [19]
Allen

[11] 3,787,040
[45] Jan. 22, 1974

[54] TILTABLE GLASS CUTTER'S TABLE WITH RETRACTABLE SHEET SUPPORTING PEGS

[76] Inventor: Byron W. Allen, 188 S. "I" St., San Bernardino, Calif.

[22] Filed: Nov. 18, 1971

[21] Appl. No.: 200,004

[52] U.S. Cl.................... 269/58, 225/104, 269/319
[51] Int. Cl............................................. B25b 11/00
[58] Field of Search . 269/20, 24, 55, 57, 58, 289 R, 269/289 MR, 298, 299, 301, 303, 315, 316, 317, 318, 319; 225/104

[56] References Cited
UNITED STATES PATENTS
3,458,056  7/1969  Stefan.............................. 269/55 X
3,458,057  7/1969  Stefan.............................. 269/55 X Primary Examiner—Harold D. Whitehead
Assistant Examiner—Mark S. Bicks
Attorney, Agent, or Firm—Dana Keech

[57] ABSTRACT

A power actuated tiltable plate glass cutter's table is shown in my U.S. Pat. No. 3,570,733, which is power tiltable between a steeply inclined position in which a heavy sheet of glass is received on said table with the sheet supported on a plurality of pegs provided at the lower edge of the table and a horizontal position in which said sheet is supported by an air floatation system permitting it to be readily shifted horizontally, said table also having a breaker bar mechanism for breaking said sheet into pieces of various size while said sheet rests on the air cushion between it and said table.

Mechanism manually operable from a control station at one end of the table, is provided by the present invention for simultaneously retracting said pegs below the surface of said table after the latter has been tilted to horizontal position and said pegs are no longer required for supporring said sheet of glass, whereby pieces of glass may be readily removed from said table horizontally over the edge of said table equipped with said pegs.

5 Claims, 9 Drawing Figures

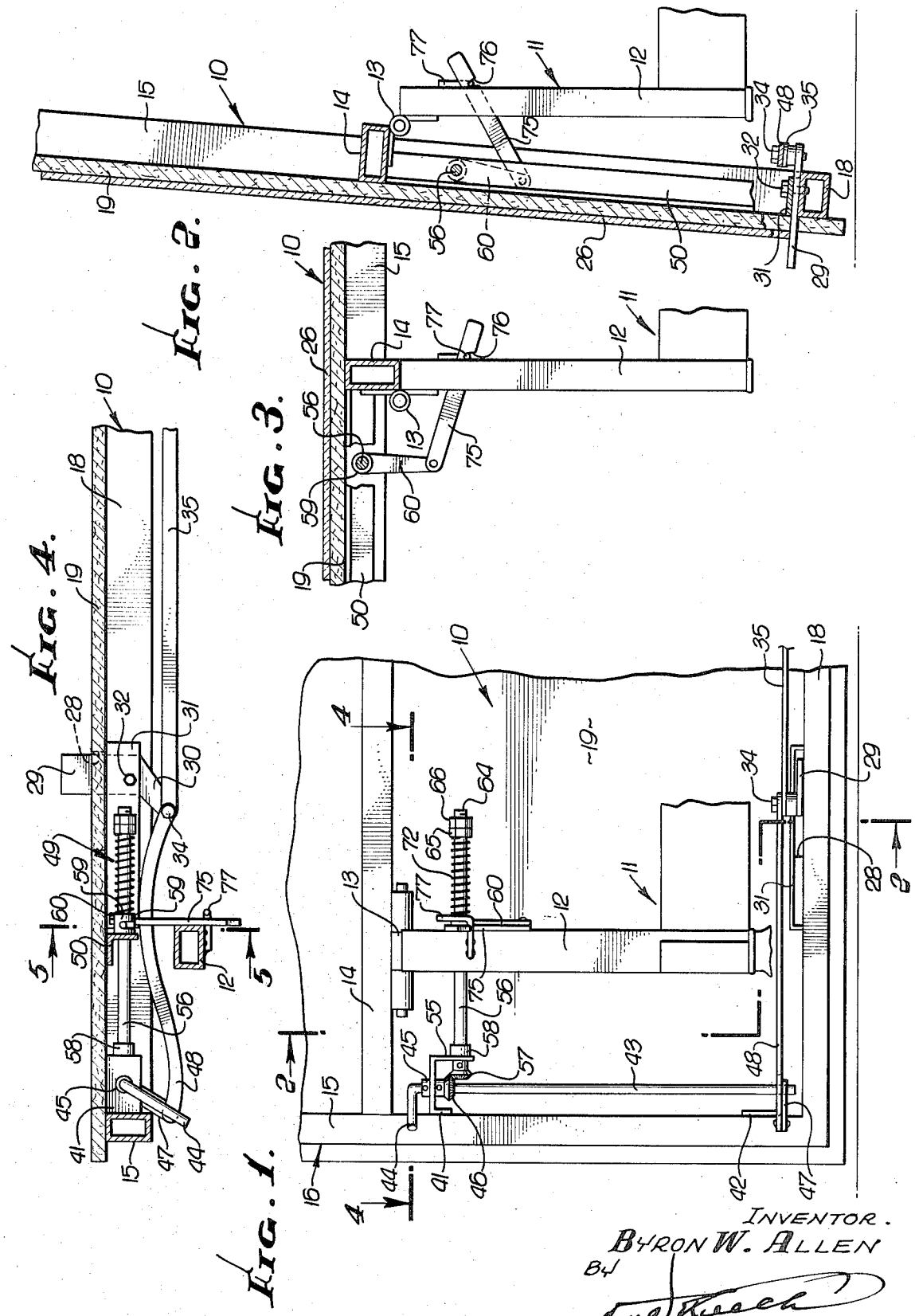

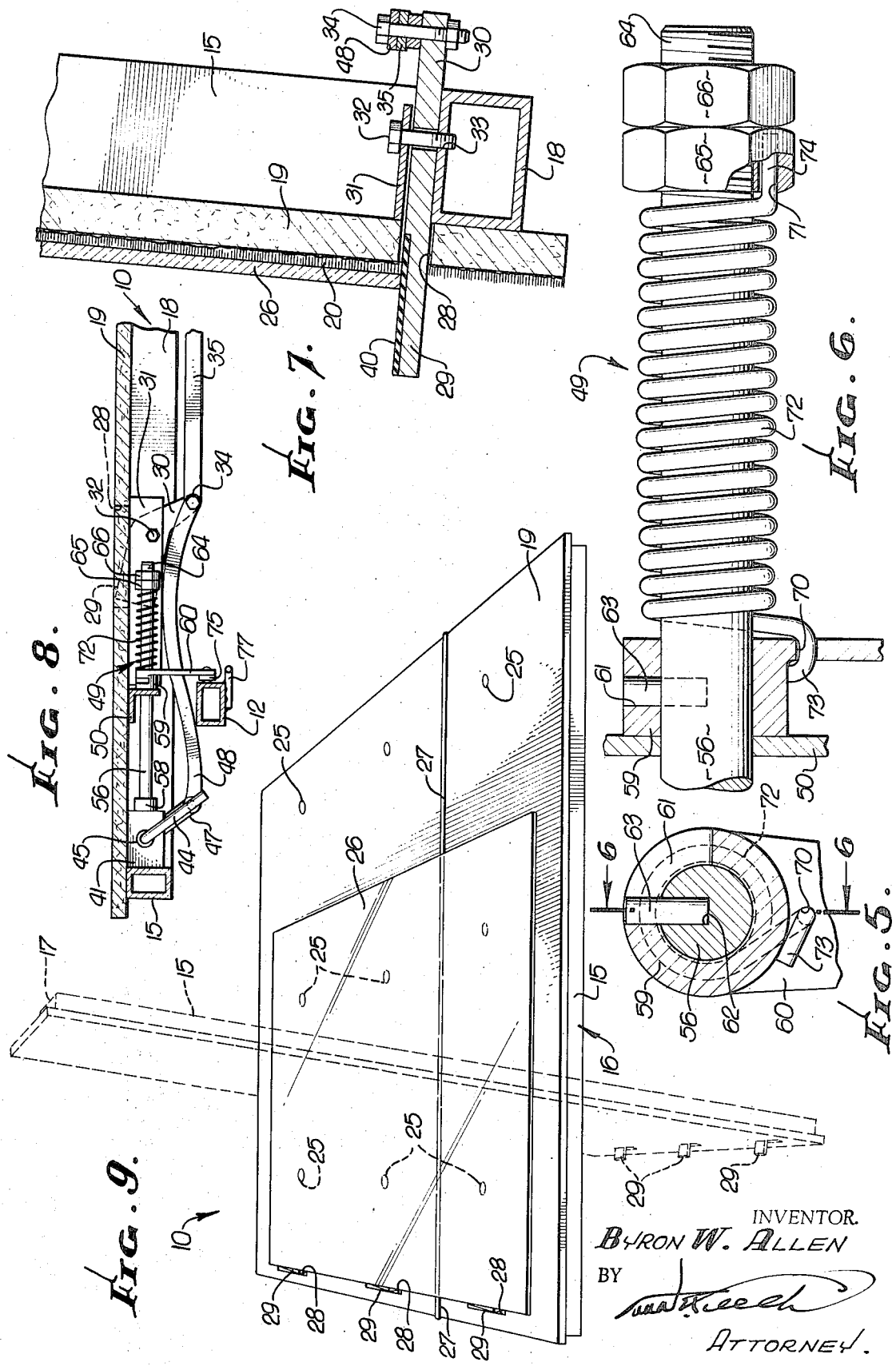

TILTABLE GLASS CUTTER'S TABLE WITH RETRACTABLE SHEET SUPPORTING PEGS

SUMMARY OF THE INVENTION

In the prior art, the glass sheet supporting pegs aforesaid have been driven into sockets provided therefor in said table. These pegs were never removed from these sockets except when they were damaged and had to be replaced and their presence along the edge of the table on which they were mounted made it necessary for a piece of glass being removed from that edge of the table to be lifted over these pegs. This necessity increased the labor of removing pieces of glass from the table and it is the primary object of the present invention to provide a means for mounting said pegs so they will be readily retractable beneath the surface of the tiltable table from a remote control station so that when the table is in horizontal position and a sheet of glass has been reduced in size to a plurality of pieces, the latter may be removed horizontally over the edge of the table in which the sheet supporting pegs are mounted without these pegs offering any obstacle to such removal.

It is a further object of the invention to provide a simple manually operated means for optionally elevating said pegs above the surface of the table along the edge of the latter in which said pegs are mounted or retracting said pegs beneath the upper surface of the table.

It is yet another object of the invention to provide, in such a tiltable plate glass cutter's table, glass sheet supporting pegs which are automatically extended above the upper surface of the table when the latter is steeply inclined for receiving a sheet of glass, and wherein said pegs are automatically retracted from such extended positions when the table has been rocked into horizontal position and the weight of said sheet of glass has been transferred from said pegs to said table.

It is a yet further object of the present invention to provide in a tiltable plate glass cutter's table having sheet glass supporting pegs provided along the lower edge of said table when the latter is tilted upwardly which are equipped with means for retracting said pegs beneath the surface of the table when the latter is disposed horizontally and extending said pegs above said surface when the table is again tilted upwardly, in which said means is optionally operable manually or automatically.

BRIEF DESCRIPTION OF THE DRAWINGS

FIG. 1 is a fragmentary rear elevational view of the left lower quarter of a preferred embodiment of the tiltable glass cutter's table of the invention.

FIG. 2 is a vertical sectional view taken on the line 2—2 of FIG. 1, FIGS. 1 and 2 showing the table tilted into steeply inclined position for receiving a sheet of glass on the pegs provided along the lower edge of said table.

FIG. 3 is a fragmentary view similar to FIG. 2 and showing the table rocked into horizontal position.

FIG. 4 is a horizontal sectional view taken on the line 4—4 of FIG. 1, and shows one of the pegs of the invention in extended position.

FIG. 5 is an enlarged sectional view taken on the line 5—5 of FIG. 4.

FIG. 6 is a sectional view taken on the line 6—6 of FIG. 5, and illustrates, with FIG. 5, the spring biased automatic peg retracting and extending mechanism of the invention.

FIG. 7 is a detailed view on an enlarged scale of a lower portion of FIG. 2 and illustrates the structure and mode of mounting of one of the pegs of the invention showing how the lower edge of a sheet of glass supported by the invention with the table thereof in upwardly inclined position rests directly on a relatively hard rubber pad inlaid in the upper surface of each of the pegs of the invention.

FIG. 8 is a view similar to FIG. 4 and illustrates the peg retracting mechanism of the invention manually actuated to retract the pegs of the invention below the upper surface of the table thereof, this view also showing the automatic means for retracting said pegs disconnected so that said retracting mechanism responds solely to said manual means.

FIG. 9 is a diagrammatic perspective view of the table of the invention with the latter shown in its horizontal position in full lines and in its upwardly inclined position in broken lines and showing the glass sheet supporting pegs of the invention extended in the broken line position of the table and retracted in the full line position of the table.

DETAILED DESCRIPTION OF THE PREFERRED EMBODIMENT

The invention is preferably embodied in a power actuated plate glass cutter's table 10 which is rockably mounted on a caster supported chassis 11 and is provided with suitable power means (not shown) for rocking said table between the two positions thereof shown in FIG. 9.

At its front corners, the chassis 11 is provided with upstanding tubular posts 12 on the upper ends of which are mounted heavy hinges 13 which pivotally connect the upper ends of said posts to a relatively heavy tubular cross beam 14 which is an integral part of the table 10. Cross beam 14 fits within and is welded at its ends to vertical end members 15 of a rectangular frame 16 having top and bottom members 17 and 18. The posts 12, tubular cross beam 14, vertical members 15, top frame member 17, and bottom frame member 18 are all formed of steel tubes the cross section of which is rectangular. Bolted to the frame 16 so as to extend about 1 inch outwardly therefrom is a rectangular table top 19 which is made up of sheets of plywood or masonite or other board formed of impacted wood fiber. The upper surface of table top 19 is covered by a soft pile carpet 20. The table 10 is also equipped with a glass sheet flotation system for delivering air under pressure upwardly through holes 25 formed in the table 10 and thus producing a body of air between the table and a sheet of glass 26 for literally floating said sheet of glass on the table and rendering it possible to shift said glass horizontally over the table in any direction by the application of a very small force to said sheet. Table 10 is also provided with a breaker bar 27 and suitable means for actuating the same for breaking a sheet of glass 26 along a scored line brought into alignment with said breaker bar by shifting the sheet of glass after it has become airborne. These features are not described in detail as they are clearly disclosed in my prior patent aforesaid.

Formed in the table top 19 and carpet 20 and approximately flush with the upper surface of bottom frame member 18 are a plurality of aligned slots 28 for accommodating the free movement therein of a like number of retractable pegs 29 which are rectangular in form and have formed integrally therewith a short actuating arm 30 which is angled to the left. Co-extensive with the slots 28 are shallow inverted U-shaped sheet metal housings 31, the opposite ends of which are welded to the upper surface of bottom frame member 18 so as to closely confine the pegs 29 with said pegs pivotally secured in place within said housings by bolts 32 which extend downwardly through suitable apertures in the housings 31 and the pegs 29 and screw into suitable tapped holes 33 provided in the bottom frame member 18. The extremities of actuating arms 30 are apertured to receive bolts 34 by which all of the pegs 29 are pivotally connected by links 35.

Inlaid within the upper surface of each of the pegs 29 is a relatively hard but resilient rubber cushion 40 which presents a cushion surface to the lower edge of the sheet of glass 26 which is supported by the pegs 29 when the table 10 is in upwardly inclined position and while it is being rocked into horizontal position.

Journalling in brackets 41 and 42 welded on the inner face of vertical member 15 shown in FIG. 1 is a peg control shaft 43, the upper end portion of which is bent at a right angle to form a handle 44 for use in manually rotating said shaft. A collar 45 on said shaft just beneath said handle rests on upper bracket 41 and a bevel gear 46 is rigidly mounted on said shaft just below said bracket. Welded to shaft 43 just below the bracket 42 is an arm 47, the outer end of which is pivotally connected to an S-shaped link 48 the opposite end of which is pivotally connected to the screw 32 of the actuating arm 30 of the leftwardmost of the pegs 29. By the mechanism above described, it is thus evident that by rotating the shaft 43 by the handle 44 all of the retractable pegs 29 may be simultaneously shifted from their extended positions as shown in FIG. 4 to their retracted positions as shown in FIG. 8 and, of course, return said pegs to their extended positions by a reverse rotation of shaft 43.

The present invention also includes a mechanism 49 for automatically accomplishing the shifting of the pegs 29 between their extended and retracted positions. This mechanism is arranged so that it may be disconnected so that it is always within the option of the operator as to whether he desires to have the pegs 29 automatically actuated or to retain the shifting of said pegs entirely under manual control.

The mechanism 49 includes a structural steel angle 50 which extends vertically between cross beam 14 and bottom frame member 18 and is welded at its opposite ends to said members. Upper bracket 41 has a downwardly extending arm 55 and this arm and angle 50 have horizontally aligned bores in which a shaft 56 journals, the left end of said shaft having fixed thereto a bevel gear 57 which meshes with bevel gear 46. A collar 58 on shaft 56 just outside of bracket arm 55 prevents endwise movement of the shaft 56. Rotatable on the shaft 56 just to the right of the angle 50 is the hub 59 of an arm 60, said hub having a slot 61 formed therein which is radially aligned with a hole 62 formed in shaft 56 so that a pin 63 extended through the slot 61 and driven into said hole fixes the position of hub 59 on said shaft and allows freedom of said hub to rotate on said shaft for approximately 90° between two positions in which said hub engages pin 63. The right hand end of shaft 56 is provided with left hand threads 64 and a pair of nuts 65 and 66 are screwed onto the threads 64. A hole 70 is provided in the arm 60 close to the hub 59 and a hole 71 is provided in the inner nut 65. A left hand coil spring 72 surrounds shaft 56 between the hub 59 and nut 65 and the opposite ends of this spring are inserted into the holes 70 and 71 so that by an adjustment of the two nuts 65 and 66 on the shaft 56 a controlled degree of torque can be applied between the right end of the shaft 56 and the arm 60 so as to constantly rotationally bias the hub 59 and the shaft 56 tending to bring the pin 63 into pressural relation with one end of the slot 61 as shown in FIG. 5.

As shown in FIGS. 2 and 3, the lower end of arm 60 pivotally connects to a control latch 75 having a notch 76 which receives a rod 77 welded horizontally to the post 12 and then turned upwardly so that latch 75 is slideably received between rod 77 and said post. The latch 75, however, is loosely pivoted to the arm 60 and may readily be lifted over the upwardly extending end portion of rod 77 and dropped downwardly outside of this so as to merely hang from arm 60 which disconnects the automatic mechanism 49 when, for any reason, it is preferred to depend solely on the handle 44 for manually retracting and extending the retractable pegs 49 of the invention.

OPERATION

FIGS. 1, 2, 3 and 4 show the control latch 75 hooked over the pivot rod 77 which conditions the automatic mechanism 49 for action. Assuming that the pegs 29 have been retracted either automatically or manually while the table 10 is horizontal and the latch 75 is hooked over rod 77 as shown in FIG. 3, the pin 63 rests against the rear end of slot 61 as shown in FIG. 5. It must also be assumed that all glass has been removed from the table 10. The table is now power rotated to the steeply inclined position shown in FIG. 2. When this happens, the latch 75 prevents the arm 60 rotating with the table 10 and thus rotates the hub 59 approximagely 90° with relation to the table 10 into the position in which it is shown in FIG. 2. This transmits a similar rotation through the pin 63 to the shaft 56 which rotation is transmitted through the beveled gears 57 and 46 to the peg control shaft 43 so as to rotate this approximately 90° from the position in which it is shown in FIG. 8 to the position in which it is shown in FIGS. 1 and 4, thereby extending the retractable pegs 29 as shown in these figures and in FIG. 2 in readiness to receive a glass sheet 26 for the next operation of the table 10.

When the table 10 is inclined upwardly as shown in broken lines in FIG. 9 and in full lines in FIGS. 1, 2, 4 and 7, and a sheet of glass 26 is lowered into place so that the lower edge of the sheet will rest on the pegs 29 as shown in FIG. 7, the entire weight of this sheet is borne by the engagement of this edge with the rubber cushion 40 provided on the upper faces of these pegs. As the table 10 is now rocked about 85° about the hinges 13 to bring the table into horizontal position as shown in full lines in FIG. 9, the control latch 75 causes a reverse rotation of the arm 60 and hub 59 through an angle of approximately 90° as shown by comparison of the views of FIGS. 2 and 3. In this rotation the hub 59 is turning in a counterclockwise direction as seen in FIG. 5 and instead of positively turning the shaft 56 as is the case when the table turns from horizontal to upwardly inclined position, the effect of this rotation on the hub 59 in a counterclockwise direction is to apply only the torque of the coil spring 72 to the shaft 56 and this torque is transmitted through the shaft 56 and gears 57 and 46 to the peg control shaft 43 and thence to the pegs 29 which are still in frictional engagement with the adjacent edge of the glass plate 26. The pressure thus applied through the spring 72 to the pegs 29 increases gradually as the table 10 is rotating towards its horizontal position until, when the weight of the glass sheet 26 has been transferred almost entirely to the table 10, the friction between the rubber cushions 40 of the pegs 29 and the adjacent edge of the glass sheet 26 is reduced to the point where the pegs 29 are able to yield to the pressure of said spring and retract beneath the upper surface of the table, which motion returns the pin 63 into contact with the left end of the slot 61 as shown in FIG. 5.

I claim:

1. A power actuated plate glass cutter's table comprising:

a relatively large rectangular flat table having a relatively non-abrasive upper surface;

means for rocking said table while a sheet of glass is resting by gravity flat against said table, between a glass sheet receiving position in which said table is inclined slightly away from vertical, and a horizontal position for the performance of a glass-sheet-cutting operation with said table and sheet disposed horizontally;

plural peg means mounted on said table along the edge thereof which is disposed downwardly when said table is in glass sheet receiving position and for supporting said sheet when delivered to said table, a mechanism for simultaneously retracting said plural peg means beneath the surface of said table after said table has received a sheet of glass resting on said peg means and been rocked into horizontal position whereby the weight of said sheet of glass has been transferred from said peg means to said table;

said peg means including a series of horizontally aligned pegs pivotally rockable on said table in a common plane disposed at right angles to the surface of said table; and a manually operable means linking together said pegs for optionally shifting said pegs between retracted and extended position.

2. A table as recited in claim 1 wherein;

said peg means actuating mechanism is automatically responsive to the rocking of said table from horizontal to upwardly inclined position to extend said peg means above the surface of said table in readiness to receive a sheet of glass delivered onto said peg means and is likewise responsive to the rocking of said table from upwardly tilted position to horizontal position to retract said peg means below the upper surface of said table.

3. A table as recited in claim 2 wherein means is provided for disconnecting said automatic peg means retracting mechanism; and manual means for retracting and extending said peg means when said automatic means is disconnected.

4. A table as recited in claim 2 wherein:

said table is provided with an air flotation system delivering air between said table and a sheet of glass resting thereon thereby relieving said sheet from frictional engagement with said peg means when said sheet and table have been rocked from an upwardly inclined position into a horizontal position, thereby facilitating the retraction of said peg means beneath the surface of said table.

5. A table as recited in claim 4 wherein:

said automatic mechanism for retracting said peg means when said table is rocked into horizontal position includes spring biased means for accomplishing the retraction of said peg means by a yieldable pressure so that said retraction is deferred until said sheet is supported by said air flotation means and is relatively free from frictional engagement with said peg means.

* * * * *